United States Patent [19]

Okuyama et al.

[11] Patent Number: 5,015,846
[45] Date of Patent: May 14, 1991

[54] LIGHT BEAM CONTROL APPARATUS AND LINEAR SCALE DEVICE SUITABLE FOR USE THEREIN

[75] Inventors: Takashi Okuyama; Masatoshi Iwama, both of Tokyo, Japan

[73] Assignee: Asahi Kogaku Kogyo K.K., Tokyo, Japan

[21] Appl. No.: 379,027

[22] Filed: Jul. 12, 1989

[30] Foreign Application Priority Data

Jul. 15, 1988 [JP] Japan .................................. 63-176646
Apr. 14, 1989 [JP] Japan .................................... 1-94399

[51] Int. Cl.⁵ .............................................. H01J 3/14
[52] U.S. Cl. .................................... 250/235; 358/494
[58] Field of Search .................... 250/235, 236, 237 G, 250/227.26, 227.31, 227.11; 358/484, 494; 350/6.5, 6.6, 6.91

[56] References Cited

U.S. PATENT DOCUMENTS

| | | | |
|---|---|---|---|
| 4,019,186 | 4/1977 | Dressen et al. | |
| 4,371,897 | 2/1983 | Kramer | 250/227.31 |
| 4,499,608 | 12/1984 | Yeadon et al. | |
| 4,638,156 | 1/1987 | Horikawa et al. | 250/235 |
| 4,661,699 | 4/1987 | Welmers et al. | 358/494 |
| 4,806,753 | 2/1989 | Noguchi | 250/235 |
| 4,853,535 | 8/1989 | Suganuma | 250/235 |

FOREIGN PATENT DOCUMENTS

58-58685 4/1983 Japan .
58-181362 10/1983 Japan .

OTHER PUBLICATIONS

"Fluoreszenkollektoren", Wilhelm Stahl and Armin Zastrow, *Physik in unserer Zeit*, 16th issue—1985.
"Study of Laser Scanning Position Detecting System", Proceedings of the Spring Meeting of the Precision Machine Society, 1983, pp. 827–828.

*Primary Examiner*—David C. Nelms
*Attorney, Agent, or Firm*—Sughrue, Mion, Zinn Macpeak & Seas

[57] ABSTRACT

A light source control apparatus comprises light source means for producing first and second beams, a first scan surface to which the first beam is applied, a second surface to which the second beam is applied, scanning means for causing the first and second beams to scan the first and second surfaces, respectively, a fluorescent optical fiber disposed along a scanning direction of the second beam for emitting fluorescent light in response to the second beam incident thereto and transmitting the fluorescent light, and photodetecting means for detecting the fluorescent light. A part of the outer surface of the fluorescent optical fiber can be the second scan surface which has alternately arranged transparent regions and opaque regions, thereby further reducing the number of components of the apparatus.

6 Claims, 8 Drawing Sheets

MONITOR SCANNING BEAM

LIGHT BEAM CONTROL APPARATUS AND LINEAR SCALE DEVICE SUITABLE FOR USE THEREIN

BACKGROUND OF THE INVENTION

The present invention relates to a light beam control apparatus, typical examples of which are a laser printer and a laser-operated figure drawing machine, and also relates to a linear scale device suitable for detecting the scanning position of a laser beam used in the light beam control apparatus.

In a laser printer or laser-operated figure drawing machine, a scanning operation is carried out with a laser beam in accordance with recording signals, to form a desired picture (including characters etc.) on a predetermined medium. In order to form a picture high both in accuracy and in picture quality, it is essential to control the scanning position of the laser beam by detecting it accurately.

For the purpose of controlling the scanning position of a laser beam, heretofore the angle of rotation of a mirror deflecting the laser beam is detected, or with respect to a predetermined point on the scanning line the scanning position is detected in a time division mode.

That is, in such a device, the scanning position of the laser beam is indirectly detected and controlled, and therefore improvement of the accuracy and resolution is limited.

In order-to overcome this difficulty, an apparatus has been proposed in the art in which the laser beam is divided into a main scanning beam and a monitor scanning beam; and while the main scanning beam is deflected, the monitor scanning beam is also deflected with one and the same scanning means so that the two beams are substantially synchronized with each other; and instead of the scanning position of the main scanning beam, the scanning position of the monitor scanning beam is detected.

FIG. 1 shows the arrangement of a detecting device for detecting the scanning position of the monitor scanning beam in such an apparatus. In FIG. 1, reference numeral 1 designates a plurality of optical fibers. First ends 2 of the optical fibers 1 are arranged in parallel with the scanning line of the monitor scanning beam, and the remaining ends are connected to respective elements in a photodetector 3. The monitor scanning beam is picked up by the optical fibers 1 and introduced to the photodetector 3, so that the photodetector 3 produces an output corresponding to incident light beams thereto. Thus, the scanning position of the monitor scanning beam (and accordingly the scanning position of the main scanning beam synchronous with the monitor scanning beam) can be detected from the output of the photodetector 3. Therefore, the scanning position of the main scanning beam on the predetermined medium can be controlled by controlling a scanning means such as scan mirror according to the output of the photodetector 3.

As was described above, the conventional apparatus employs a plurality of optical fibers, and therefore it follows that the apparatus is large in the number of components, high in manufacturing cost, and unavoidably bulky.

FIG. 2 shows the arrangement of a conventional laser-operated figure drawing machine of another type. In the machine, a laser beam generated by a laser beam generator 11 is applied to a half-mirror 12, where it is divided into first and second beams, namely, a main beam and a monitor beam. The first beam (main beam) is applied to a modulator 13, where it is modulated with a recording signal. The main beam thus modulated is expanded by a beam expander 14, and then applied to a rotary polygonal mirror 15. The main beam reflected by the polygonal mirror 15 is applied to an f$\theta$ lens 16 where the scanning speed is corrected, and the main beam thus processed is applied through a mirror 17 to a recording surface 18. The recording surface 18 is moved in an auxiliary scanning direction (for instance in a horizontal direction in the paper surface of FIG. 2) while the main beam is deflected by the rotary polygonal mirror 15 in a main scanning direction (for instance in a direction perpendicular to the paper surface of the drawing). Therefore, an image is formed on the recording surface 18 in correspondence to the recording signal.

On the other hand, the second beam (or monitor beam) is applied to the beam expander 14 without passing through the modulator 13. Instead, the monitor beam is reflected by a plurality of mirrors (omitted in FIG. 2). Then, the monitor beam is applied through the rotary polygonal mirror 15, the f$\theta$ lens 16, the mirror 17, and a mirror 19 to a linear scale 20. The reason why only the monitor beam is received by the mirror 19 is that the monitor beam has been spatially separated from the main beam by the optical system disposed before the polygonal mirror 15. The linear scale 20, as shown in FIG. 3, has a number of slits 20A arranged along the monitor scanning direction. Therefore, as the monitor beam is deflected in the main scanning direction by the rotary polygonal mirror 15 in synchronization with the main beam, it is turned on and off by the slits 20A, thus being formed into a pulsed beam in the form of a train of pulses. The monitor beam thus processed is collected by a light guide 21 provided behind the linear scale 20, and is then applied to a photodetector 22. Accordingly, the photodetector 22 outputs pulses in correspondence to the scanning operation in the main scanning direction. Thus, for instance by counting the output pulses, the scanning position of the beam in the main scanning direction can be detected.

As was described above, in the conventional figure drawing machine, it is necessary to provide the light guide 21 behind the linear scale 20 to transmit the light beam to the photodetector 22. Therefore, it follows that the apparatus is large in the number of components, intricate in construction, and bulky.

SUMMARY OF THE INVENTION

Accordingly, an object of the present invention is to provide a light beam control apparatus with the reduced number of components, simplified construction and reduced size, and thereby having a lower manufacturing cost.

Another object of the invention is to provide a linear scale device suitable for use in the above light beam control apparatus.

The foregoing object of the invention has been achieved by the provision of a light beam control apparatus which comprises: light source means for producing first and second beams; a first scan surface to which the first beam is applied; a second scan surface to which the second beam is applied; scanning means for causing the first and second beams to scan the first and second scan surfaces, respectively; light concentrating means disposed along a scanning direction of the second beam, for outputting light in response to the second beam incident thereto; and photodetecting means for detecting the light from the light concentrating means.

In the light beam control device of the invention, the first and second beams are applied to the first and second scan surfaces, respectively, while being deflected by one and the same scanning means. The second scan surface has transparent regions and opaque regions, so that the light concentrating means made up of a fluorescent optical fiber for instance outputs a pulsed light beam. By counting the pulses, the scanning position of the second beam (and accordingly the scanning position of the first beam) can be detected.

Furthermore, a linear scale device according to the invention comprises: a first member having a first refractive index and also having, at least at a part thereof, transparent regions and opaque regions which are regularly and alternately arranged in a longitudinal direction of the first member; a second member disposed inside the first member, in which fluorescent material is dispersed substantially uniformly, the second member having a second refractive index larger than the first refractive index so as to transmit fluorescent light emitted from the fluorescent material towards end faces of the second member.

The transparent regions such as slits are formed in the surface of the first member, so as to apply light to the second member. The second member produces fluorescent light in response to a light beam incident thereto through the transparent regions. Since the refractive index of the second member is larger than that of the first member, the fluorescent light, being unable to pass through the first member, is transmitted towards the end faces of the second member. Therefore, the fluorescent light can be detected, for instance, with photodetectors arranged on the end faces of the second member.

Other and further objects, features and advantages of the invention will appear more fully from the following description taken in connection with the accompanying drawings.

PREFERRED EMBODIMENTS OF THE INVENTION

Figure 1:
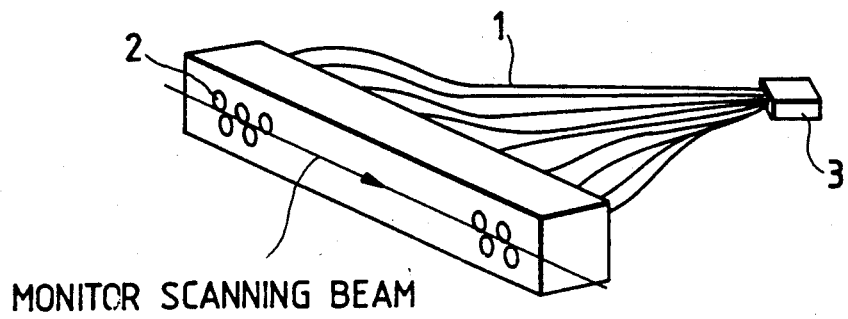
FIG. 1 is a perspective view showing a conventional light beam scanning position detecting device.
Figure 2:
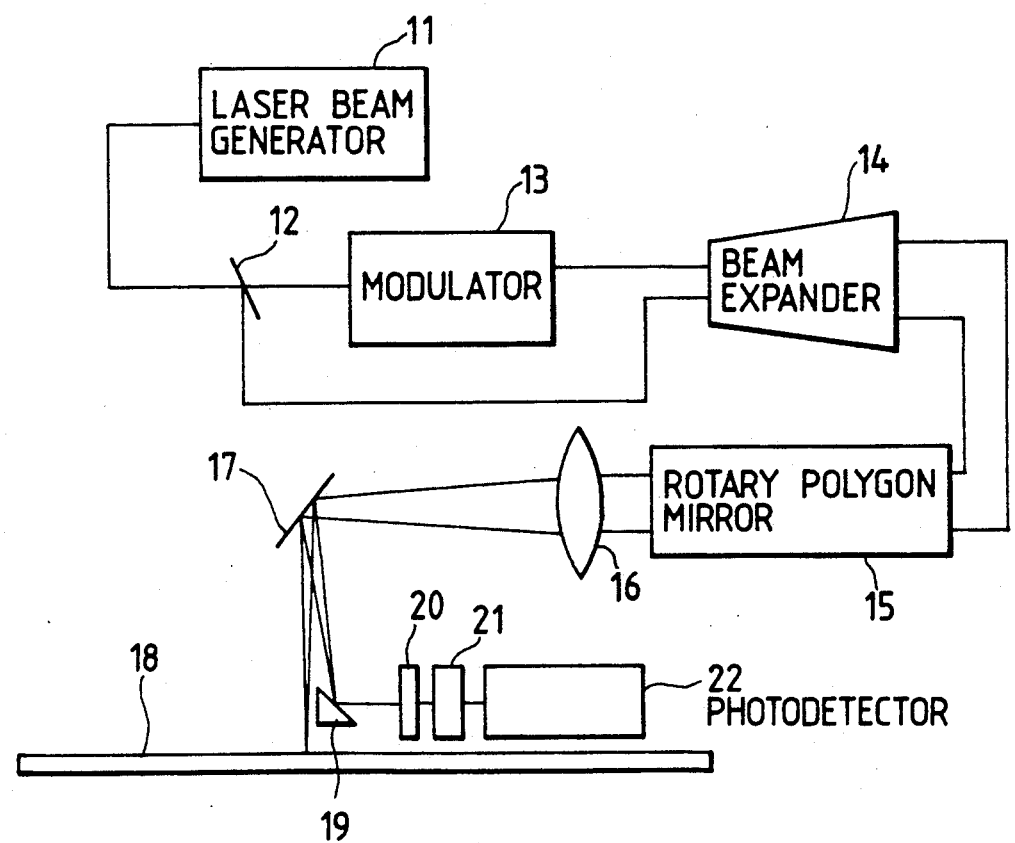
FIG. 2 is a block diagram showing the arrangement of a conventional laser-operated figure drawing machine.
Figure 3:
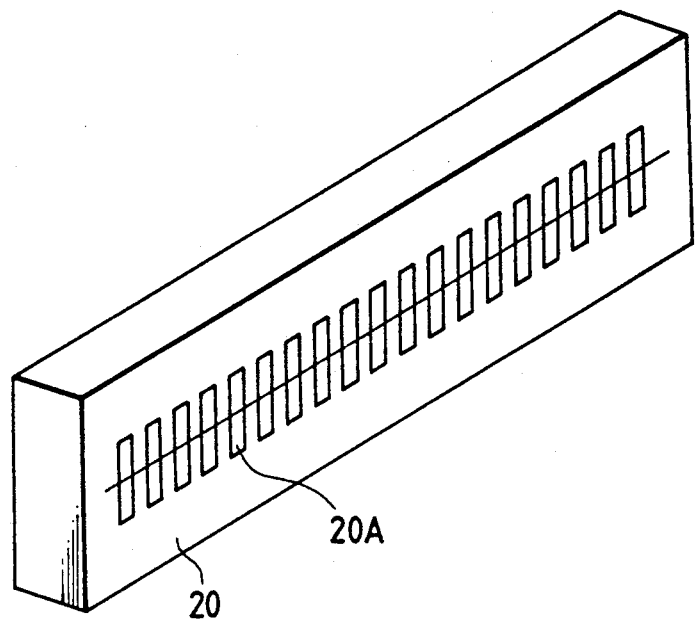
FIG. 3 is a perspective view showing a conventional linear scale in the laser-operated figure drawing machine.
Figure 4:
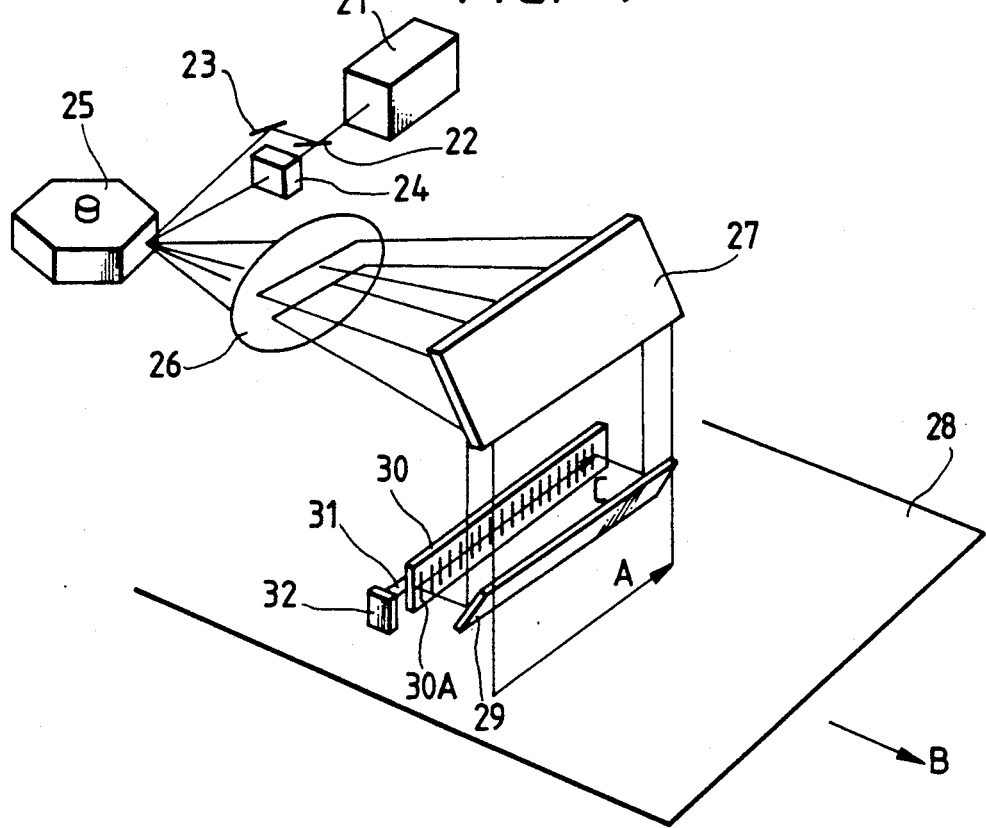
FIG. 4 is a perspective view showing the arrangement of an optical system in a light beam control device according to this invention.

FIG. 4 is a perspective view showing an optical system of a light beam control apparatus according to the present invention. In FIG. 4, reference numeral 21 designates a light source such as an argon laser or a semiconductor laser; and 22, a half-mirror for dividing an output laser beam of the light source 21 into a main scanning beam and a monitor scanning beam. The main scanning beam is applied through a modulator 24 to scanning means, namely, a scan mirror 25, while the monitor scanning beam is applied through a beam bender (mirror) 23 to the scan mirror 25. It goes without saying that, if two light sources are provided so that their output beams are applied to the scan mirror 25 as required, then the half-mirror 22 and the beam bender 23 can be eliminated. Furthermore, if a semiconductor laser is employed as the light source 21, the modulator 24 may be not necessary.

Figure 5:
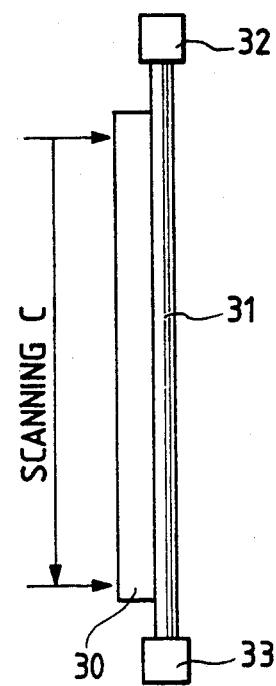
FIG. 5 is a plan view showing a monitor scanning beam detecting section in the light beam control device according to the invention.

Further in FIG. 4, reference numeral 26 designates an fθ lens; 27 and 29, beam benders; 28, a main scan surface on which a desired figure is formed; 30, a scale with a monitor scan surface 30A; 31, a fluorescent optical fiber; and 32 and 33, photodetectors provided on both end faces of the fluorescent optical fiber 31 (also see FIG. 5)

Figure 6:
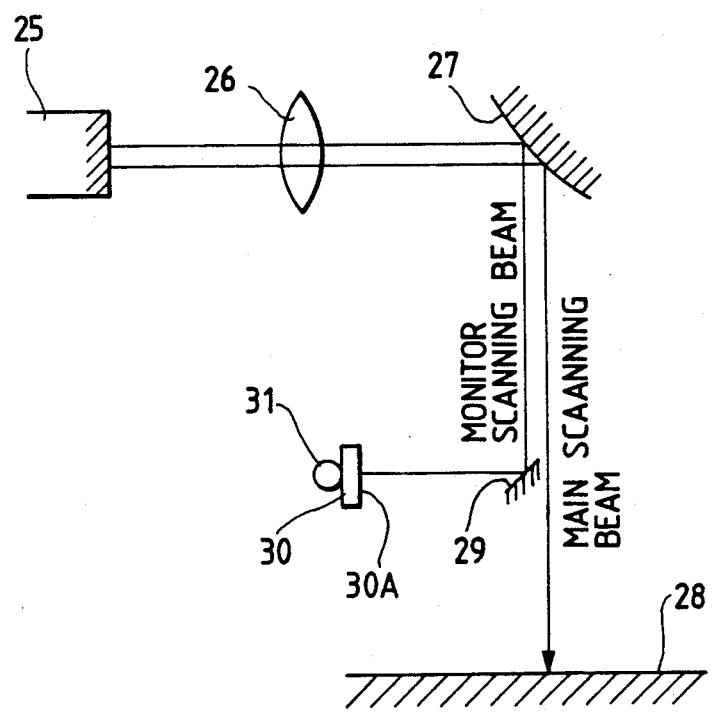
FIG. 6 is a side view outlining the optical system in the light beam control device according to the invention.
Figure 7:
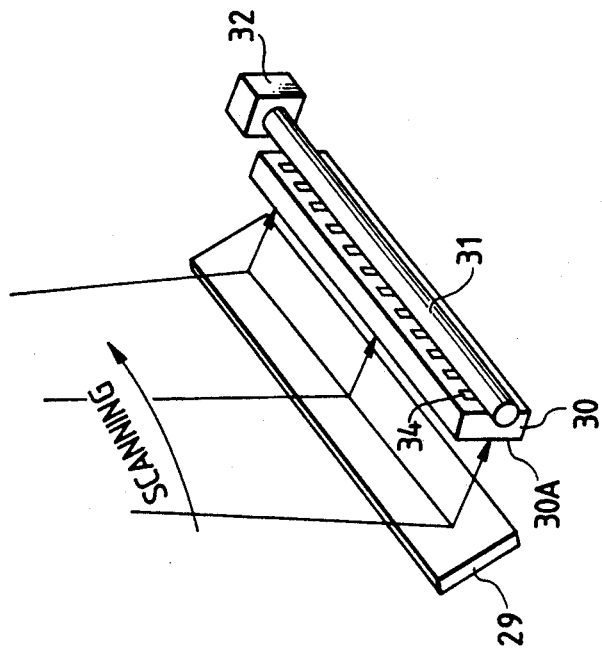
FIG. 7 is a perspective view showing a monitor scanning beam detecting section of the invention.

As outlined in FIG. 6, the main scanning beam reflected by the scan mirror 25 is applied through the lens 26 and the beam bender 27 to the main scan surface 28. On the other hand, the monitor scanning beam reflected by the scan mirror 25 is applied through the lens 26 and the beam benders 27 and 29 to the scale 30 and to the fluorescent optical fiber 31. FIG. 7 is an enlarged view showing the positional relationships between the beam bender 29, the scale 30 and the fluorescent optical fiber 31.

As shown in FIG. 7, the scale 30 has a number of transparent regions, namely, slits 34 which permits transmission of the laser beam, and a number of opaque regions to intercept the laser beam which are other than the slits 34.

Figure 8:
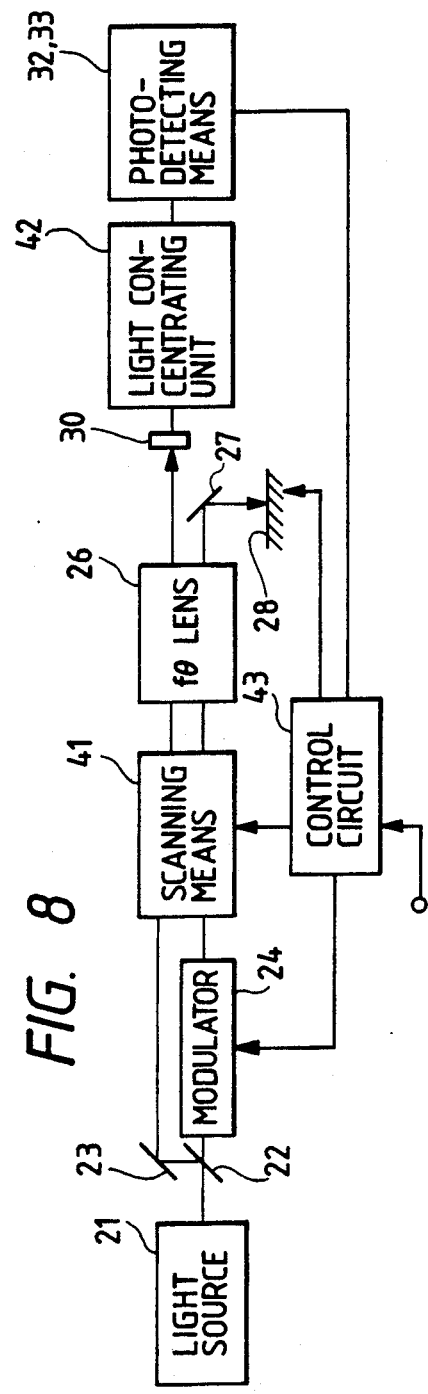
FIG. 8 is a block diagram showing the arrangement of the light beam control device according to the invention.

FIG. 8 is a block diagram showing the arrangement of the light beam control apparatus according to the invention. In FIG. 8, reference numeral 41 designates scanning means corresponding to the scan mirror 25 in FIG. 4; 42, a light concentrating unit corresponding to the fluorescent optical fiber 31 in FIG. 4; and 43, a control circuit functioning as detecting means. The control circuit 43 detects the scanning position of the monitor scanning beam by using the outputs of the photodetecting means 32 and 33, and controls the modulator 24 (or scanning means 41) according to the result of detection. The control circuit 43 further operates to drive the main scan surface 28 in a predetermined direction.

For simplification in illustration, in FIG. 8 the monitor scanning beam from the fθ lens 26 is directly applied to the scale 30.

The operation of the light beam control device thus organized will be described. The output laser beam of the light source 21 is divided into the main scanning beam and the monitor scanning beam by means of the half-mirror 22. The main scanning beam is applied through the modulator 24 to the scan mirror 25, where it is reflected. The main scanning beam reflected by the scan mirror 25 is applied through the fθ lens 26 to the beam bender 27, where it is reflected again so that it is applied to the main scan surface 28. The scan mirror 25 is rotated in a predetermined direction under the control of the control circuit 43. Therefore, the main scanning beam scans the main scan surface 28 in a direction A perpendicular to the direction B of movement of the main scan surface 28, in association with the rotation of the scan mirror 25.

The control circuit 43 controls the modulator 24 according to the recording signal to modulate the main scanning beam (on/off modulation), and drives the main scan surface 28 in the direction B. Thus, the figure corresponding to the recording signal is formed on the main scan surface 28.

Figure 9A:
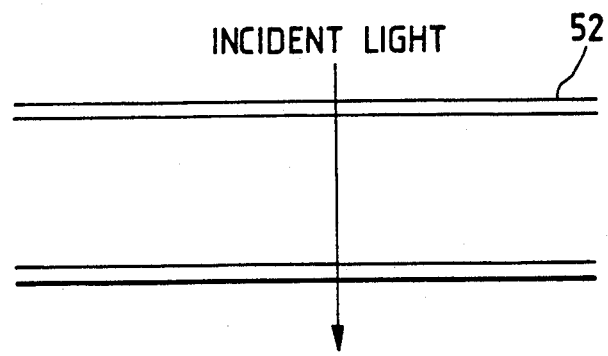
FIGS. 9(a) and 9(b) are diagrams for explaining a fluorescent optical fiber employed in the invention.
Figure 9B:
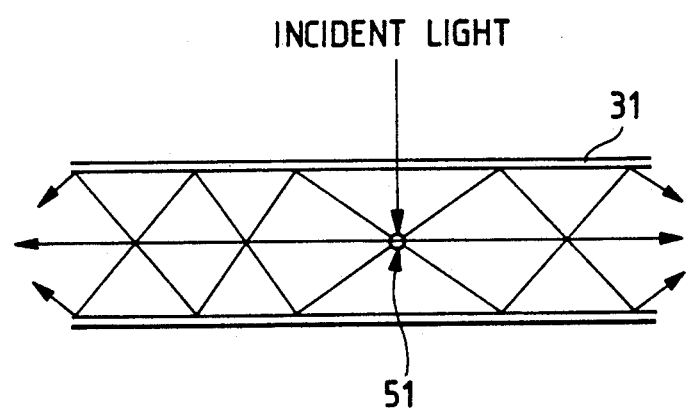

On the other hand, the monitor scanning beam obtained by the half-mirror 22 is reflected by the beam bender 23, and is applied to the scan mirror 25 in such a manner that it forms a predetermined angle with the main scanning beam. The monitor scanning beam is reflected by the scan mirror 25, so that it is applied through the fθ lens 26 to the beam bender 27, where it is reflected again. The monitor scanning beam thus reflected is applied to the beam bender 29. The monitor scanning beam, being reflected by the beam bender 29, is applied to the monitor scanning surface 30A. In association with the rotation of the scan mirror 25, the monitor scanning beam scans the monitor scan surface 30A in a direction C which is in parallel with the main scanning direction. When the monitor scanning beam comes to any one of the slits 24 while scanning the monitor scan surface 30A, it passes through the slit 34. The fluorescent optical fiber 31 is so arranged that its center is substantially in alignment with the optical axis of the monitor scanning beam, and therefore the monitor scanning beam passed through the slit 34 enters the fluorescent optical fiber 31. If, in this case, the light concentrating unit 42 is made up of an ordinary optical fiber, then the monitor scanning beam passes through the optical fiber 52 as shown in FIG. 9(a); but if it is made up of the fluorescent optical fiber 31, then the fluorescent material 51 contained in it produced fluorescent light in response to light applied thereto, and the fluorescent light thus produced is transmitted to both ends of the fluorescent optical fiber 31 as shown in FIG. 9(b), and is detected by the photodetectors 32 and 33. The monitor scanning beam is intercepted by the opaque regions where no slits are provided, and in this case no fluorescent light is produced. Thus, the photodetectors 32 and 33 output pulses corresponding to the scanning positions of the monitor scanning beam. The control circuit 43 counts the pulses every scanning operation, detects the scanning position of the monitor scanning beam by using the count value, and controls the modulation timing (or the position of rotation of the scan mirror 25, i.e., the scanning means 41) of the modulator 24 according to the scanning position thus detected. The monitor scan surface 30A is provided at a position which is equivalent to that of the main scan surface 28. Therefore, the scanning position of the monitor scanning beam on the monitor scan surface 30A corresponds to that of the main scanning beam on the main scan surface 28. Hence, the above-described control can form a desired image at a desired position on the main scan surface 28.

Errors attributing to the propagation velocity and dispersion in the fluorescent optical fiber 31 can be substantially disregarded in practical use. However, sometimes variation in the quantity of light due to the propagation loss in the fluorescent optical fiber 31 cannot be disregarded. Therefore, it is preferable to provide the photodetectors 32 and 33 on both end faces of the fluorescent optical fiber 31 as was described above, although theoretically the detection can be achieved with only one photodetector provided on one end face of the fluorescent optical fiber 31. That is, when the scanning position is farther from one photodetector 32 (or 33) where accordingly the light beam is larger in the attenuation amount, it is closer to the other photodetector 33 (or 32) where it is smaller in the attenuation amount. Therefore, by adding the outputs of the two photodetectors, the quantity of light substantially constant can be received irrespective of the scanning position.

The fluorescent optical fiber 31 may be one which has relatively large propagation loss. In this case, the scanning position can be detected from the difference between the outputs of the two photodetectors 32 and 33 provided on the end faces of the fluorescent optical fiber 31.

Figure 10:
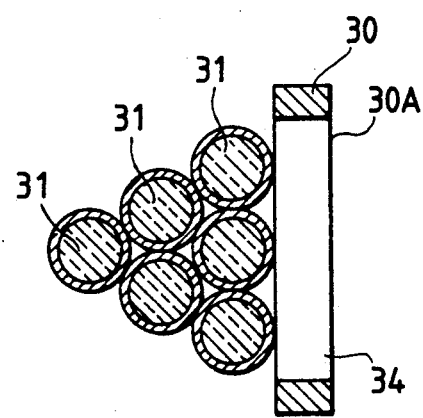
FIG. 10 is a cross-sectional view showing an example of the arrangement in which a plurality of fluorescent optical fibers are used.

In the above-described embodiment, only one fluorescent optical fiber 31 is employed. However, a plurality of fluorescent optical fibers may be used, with their outputs received by the common photodetectors. An example of this arrangement is illustrated in a crosssectional view of FIG. 10. In this case, the alignment of the fluorescent optical fibers with the optical axis of the monitor scanning beam can be readily achieved.

As was described above, in the light beam control apparatus according to the invention, the slits are formed in the monitor scan surface, and the light beam outputted through the slits are collected with the common fluorescent optical fiber. The scanning position of the light beam is detected by using the output of the fluorescent optical fiber. Therefore, the light beam control apparatus of the invention is smaller in the number of components, low in manufacturing cost and small in size.

Figure 11:
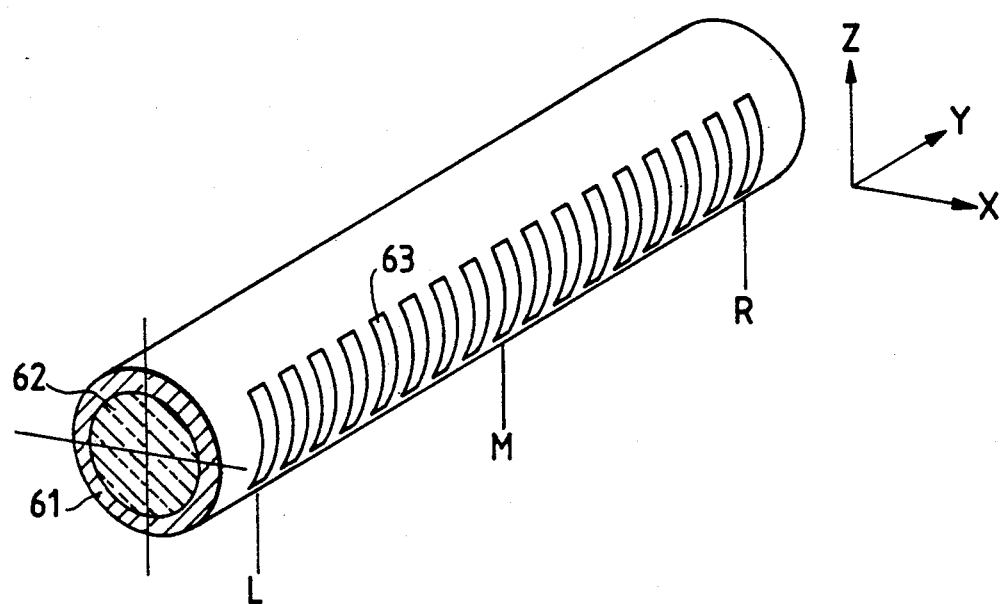
FIG. 11 is a perspective view showing a first example of a linear scale device according to the invention.

FIG. 11 shows a linear scale device according to the present invention, which has such a structure that the monitor scan surface and the fluorescent optical fiber in the above embodiment are unified. In FIG. 11, reference numeral 61 designates a first member made of glass for instance which is substantially in the form of a cylindrical pipe; 62, a second member made of glass or the like inside the first member 61; 63, a plurality of slits formed in the first member at predetermined intervals. The refractive index of the second member 62 is larger than that of the first member 61. In addition, fluorescent material for absorbing light incident thereto through the slits 63 is uniformly dispersed in the second member 62.

Figure 12:
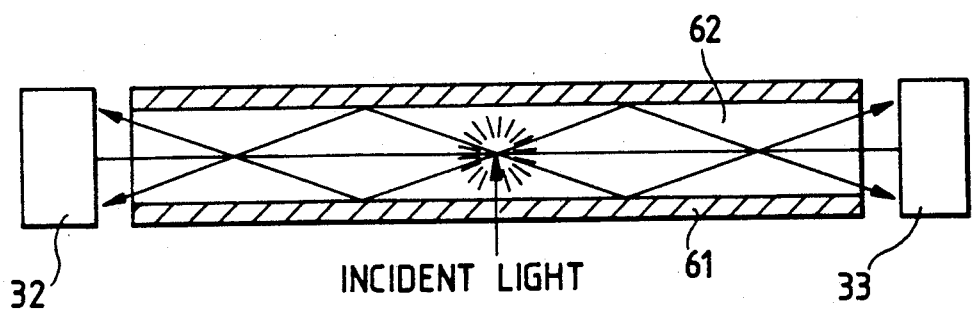
FIG. 12 is a diagram for explaining the principle of the linear scale device according to the invention.

The function of the linear scale device thus constructed will be described with reference to FIG. 12, which is similar to FIG. 9(b).

For instance, when the monitor scanning beam described with reference to FIG. 4 is applied to the first member 61, it enters the second member 62 through the slits 63. The incident light is absorbed by the fluorescent material contained in the second member, and the fluorescent material in turn produces fluorescent light.

As was described above, the refractive index of the second member 62 is larger than that of the first member 61. Therefore, similarly as in an ordinary optical fiber, the fluorescent light produced in the second member 62, being reflected by the inner wall of the first member 61, cannot pass through the latter, as a result of which the fluorescent light is transmitted to the right and left end face of the second member 62. This fluorescent light is detected by photodetectors 32 and 33 provided on the right and left end faces of the second member 62. This fluorescent light is detected by photodetectors 32 and 33 provided on the right and left end faces of the second member 62.

Since the incident light is turned on and off by the slits 63, the fluorescent light thus produced is turned on and off. Accordingly, the photodetectors 32 and 33 provide pulses in correspondence to the slits 63. By counting the pulses, the incident position of the monitor scanning beam can be detected.

Figure 13:
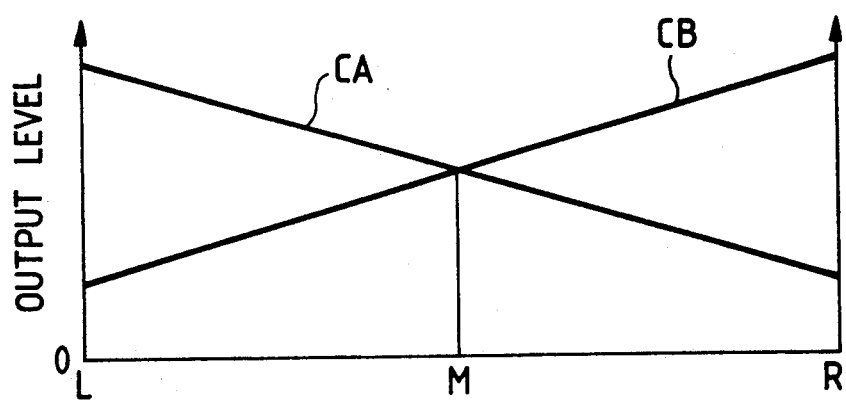
FIGS. 13 and 14 are graphical representations indicating the output characteristics of photodetectors in the linear scale device according to the invention.

In the case where the fluorescent light is sufficiently attenuated while transmitting in the second member 62, the attenuation can be utilized to detect the incident position. At each of the photodetectors 32 and 33, as the incident position approaches it, the attenuation of the fluorescent light is decreased; that is, the detected intensity of the fluorescent light is increased. Therefore, as shown in FIG. 13 in which reference characters R and L designate the positions of the right-most and left-most slits (also see FIG. 11), the photodetector 32 shows an output characteristic CA that has a maximum when the incident position is L, and has a minimum when R; and the photodetector 33 shows an output characteristic CB that has a minimum when the incident position is L, and has a maximum when R. Hence, by using the level of the output of the photodetector 32 or 33, the incident position can be detected.

Figure 14:
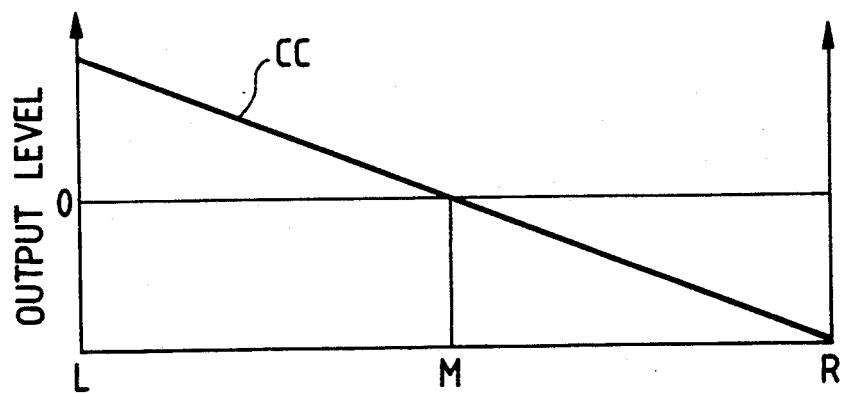

Alternatively, the incident position can be detected from the difference (CA - CB) between the outputs of the photodetectors 32 and 33. In this case, the output characteristic CC is such that, as shown in FIG. 14, the output level is maximum (positive) when the incident position is L, it is zero when the incident position is the intermediate position M, and it is minimum (negative) when R.

In order to produce the fluorescent light pulsewise, it is necessary for the linear scale device to have transparent regions which permit transmission of the incident light, and opaque regions which intercept the incident light. For this purpose, the slits 63 are formed in the first member 61. However, in the case where the transmission loss of the second member 62 is utilized, the first member 61 may be so designed as to continuously apply the incident light to the second member 62. In this case, the incident position can be detected more precisely.

Figure 15:
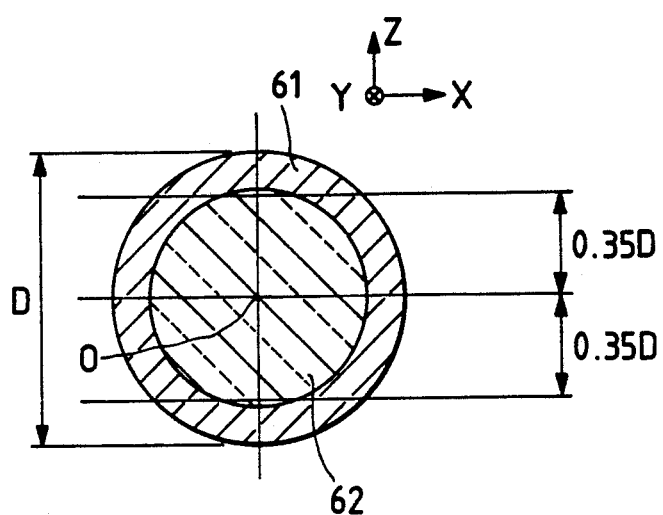
FIG. 15 is a sectional view showing the first example of the linear scale device according to the invention.

Experiments were performed under the conditions that the incident light was a 488 nm argon laser beam, the wavelength of the fluorescent light was 589 nm in peak, the refractive index of the first member 61 was 1.42, the refractive index of the second member 62 was 1.59, the outside diameter D of the first member 61 was 2.00 mm, the wall thickness of the first member 61 was 20 μm, and the incident light was 5 μm in spot diameter. When, as shown in FIG. 15, the amount of shift of the incident light spot in a direction perpendicular to the scanning direction (or the direction of Z-axis) was within ±0.35D from the center 0 of the member 61 (or 62), more than 95% of the output provided when the incident light was applied to the center 0 could be obtained.

Figure 16:
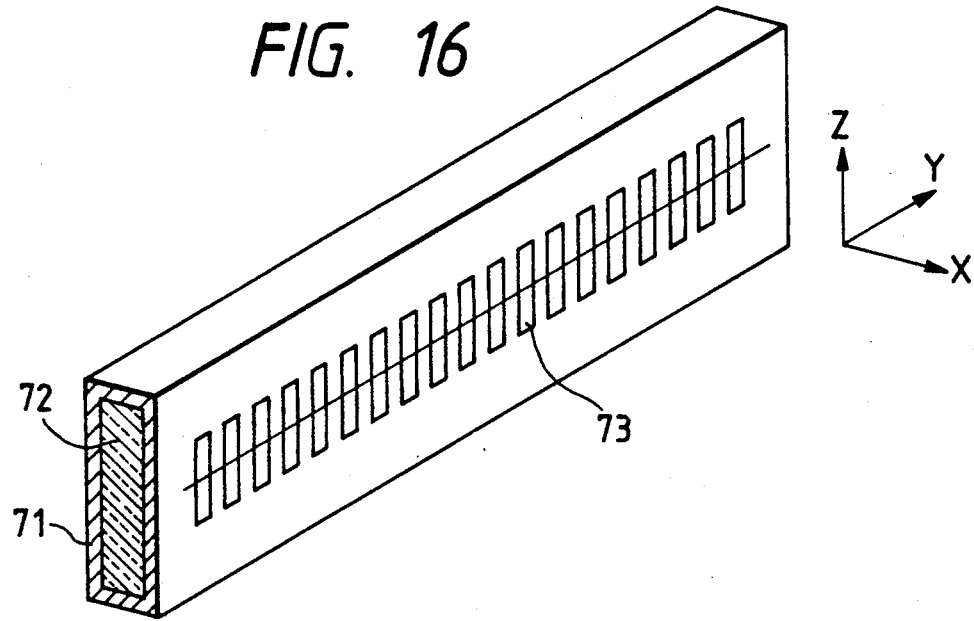
FIG. 16 is a perspective view showing a second example of the linear scale device according to the invention.

FIG. 16 shows another example of the linear scale device according to the invention. In the linear scale device of FIG. 16, the first member 71 is rectangular in section so that the incident surface for receiving the incident light is flat. In this case, the range of tolerance for the shift of the incident position of the light spot in the direction of Z-axis may be larger than that in the case of the linear scale device round in section as shown in FIG. 15.

As was described above, using the linear scale device according to the invention, the light beam control apparatus can be reduced in the number of components, simplified in construction, miniaturized in size and reduced in manufacturing cost even compared with the apparatus shown in FIG. 4.

What is claimed is:

1. A light beam control apparatus comprising:
light source means for producing first and second beams;
a first scan surface to which said first beam is applied;
a second scan surface to which said second beam is applied;
scanning means for causing said first and second beams to scan said first and second scan surfaces, respectively;
fluorescent optical fiber means disposed along a scanning direction of said second beam, for emitting fluorescent light in response to said second beam incident thereto and transmitting said fluorescent light; and
photodetecting means for detecting said fluorescent light;
control means for determining a scanning position of said first beam on said first scan surface by using an output signal from said photodetecting means; and
modulating means for on/off-modulating said first beam, wherein said control means adjusts said scanning position of said first beam through controlling an on/off-modulation timing of said modulating means.

2. A light beam control apparatus comprising:
light source means for producing first and second beams;
a first scan surface to which said first beam is applied;
a second scan surface to which said second beam is applied;
scanning means for causing said first and second beams to scan said first and second scan surfaces, respectively;
fluorescent optical fiber means disposed along a scanning direction of said second beam, for emitting fluorescent light in response to said second beam incident thereto and transmitting said fluorescent light; and
photodetecting means for detecting said fluorescent light,
wherein said second scan surface is a part of an outer surface of said fluorescent optical fiber means, and wherein said part of said outer surface comprises transparent regions and opaque regions which are regularly and alternately arranged along said scanning direction of said second beam, and said control means counts pulses included in said output signal from said photodetecting means.

3. A light beam control apparatus comprising:

light source means for producing first and second beams;

a first scan surface to which said first beam is applied;

a second scan surface to which said second beam is applied;

scanning means for causing said first and second beams to scan said first and second scan surfaces, respectively;

fluorescent optical fiber means disposed along a scanning direction of said second beam, for emitting fluorescent light in response to said second beam incident thereto and transmitting said fluorescent light; and photodetecting means for detecting said fluorescent light, wherein said fluorescent optical fiber means comprises a plurality of fluorescent optical fibers arranged in parallel, and common photodetecting means detects fluorescent light from said plurality of fluorescent optical fibers.

4. A light beam control apparatus as claimed in claim 3, wherein said fluorescent optical fibers are arranged so that each fluorescent optical fiber contacts at least two adjacent fluorescent optical fibers.

5. A light beam control apparatus, comprising:

light source means for producing first and second beams;

a first scan surface to which said first beam is applied;

a second scan surface to which said second beam is applied;

scanning means for causing said first and second beams to scan said first and second scan surfaces, respectively;

fluorescent optical fiber means disposed along a scanning direction of said second beam, for emitting fluorescent light in response to said second beam incident thereto and transmitting said fluorescent light;

photodetecting means for detecting said fluorescent light; and control means for determining a scanning position of said first beam on said first scan surface on the basis of the level of an output signal from said photodetecting means, said level of said output signal progressively changing with changing position of said first beam in a first direction along said scan surface.

6. A light beam control apparatus, comprising:

light source means for producing first and second beams;

a first scan surface to which said first beam is applied;

a second scan surface to which said second beam is applied;

scanning means for causing said first and second beams to scan said first and second scan surfaces, respectively;

fluorescent optical fiber means disposed along a scanning direction of said second beam, for emitting fluorescent light in response to said second beam incident thereto and transmitting said fluorescent light;

photodetecting means for detecting said fluorescent light, said photodetecting means comprising first and second photodetectors disposed on respective end faces of said fluorescent optical fiber means; and control means for determining a scanning position of said first beam on said first scan surface on the basis of a difference between output signals from said first and second photodetectors.

* * * * *